April 20, 1954  H. A. TINTES ET AL  2,675,665
SWATH LIFTER
Filed Feb. 7, 1952
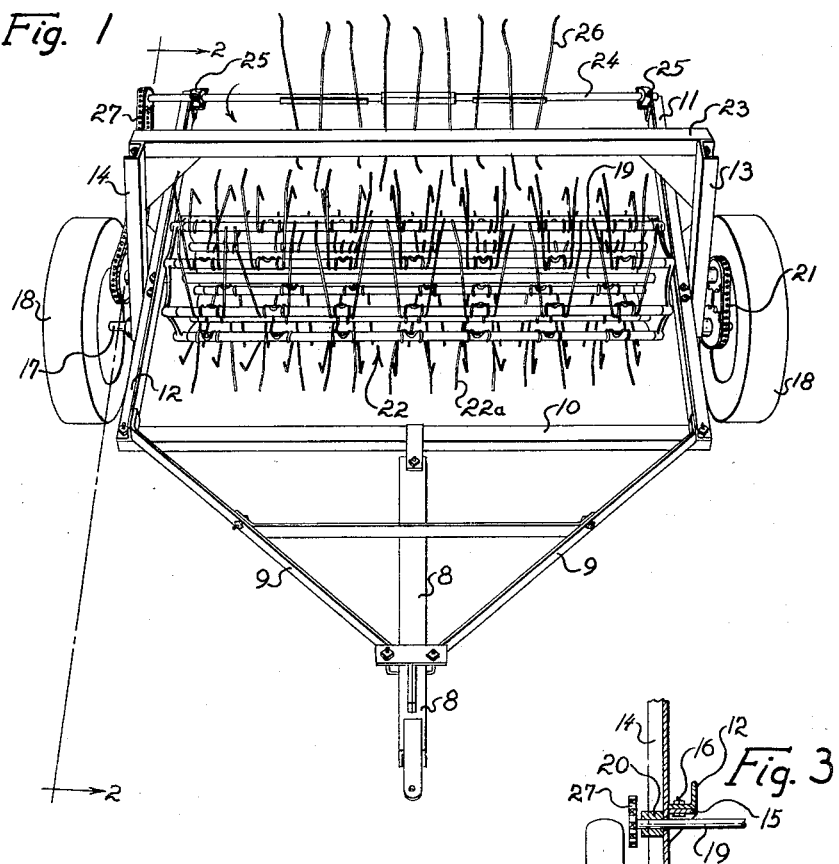
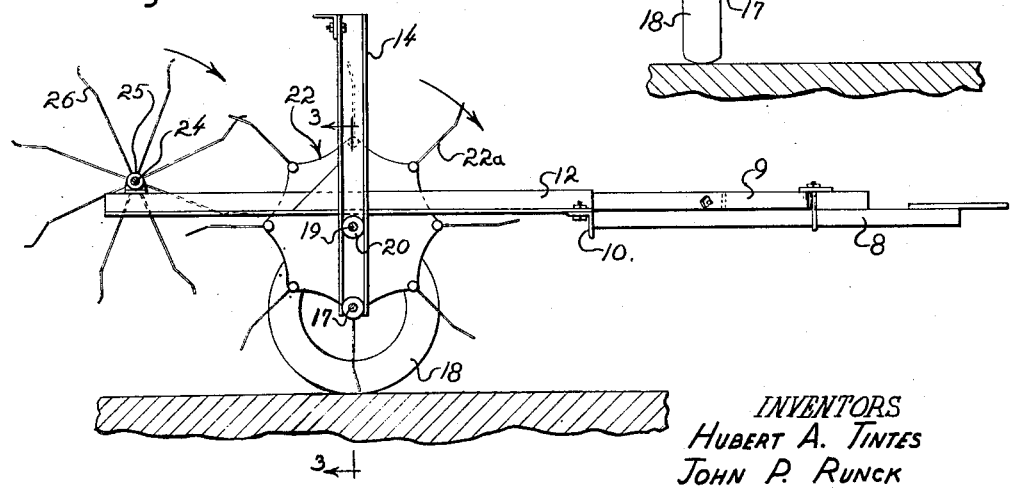
INVENTORS
HUBERT A. TINTES
JOHN P. RUNCK
BY Williamson & Williamson
ATTORNEYS Patented Apr. 20, 1954

2,675,665

UNITED STATES PATENT OFFICE 2,675,665

SWATH LIFTER

Hubert A. Tintes and John P. Runck, West Fargo, N. Dak., assignors to West Fargo Manufacturing Co., West Fargo, N. Dak., a corporation of North Dakota Application February 7, 1952, Serial No. 270,304

4 Claims. (Cl. 56—372)

This invention relates generally to windrow or swath lifters and more particularly to improvements in the Swath Lifter disclosed and claimed in United States Letters Patent No. 2,330,910, granted October 5, 1943, to Mr. Nels P. Ostman, and now owned by the assignee of the present invention.

As brought out in the Ostman patent, it is a serious problem to maintain a windrow of grain in a loose unmatted condition for optimum drying and ripening after being cut. This is particularly true in wet weather which causes matting and rotting of the windrowed grain. While the Ostman machine worked quite satisfactorily to gently lift the windrowed grain stalks and raise the windrow to rest upon the stubble in the field while loosening the stalks one from another, there was a tendency for the lifting tines of the Ostman machine to retain the engaged grain stalks thereon which caused winding of the grain around the drum and produced clogging and inefficient operation of the lifting tines. It was also found that instead of using the large diameter wheels shown in the Ostman patent a considerably more efficient manufacturing operation would be produced by supporting the machine on conventional automotive wheels which are considerably smaller in diameter than the diameter of the tine carrying drum and therefore must be supported on an axis of rotation below the axis of said drum, thus creating a serious problem of providing a frame structure sufficiently rigid to support the separate wheel axles and prevent the outer ends of said axles from bowing upwardly under the weight of the machine.

It is therefore an object of our present invention to provide a machine having improved operating efficiency over the Ostman machine by incorporating a tine cleaning mechanism therewith to prevent the engaged grain stalks from being retained and wound on the lifting tines during the operation of the machine.

It is another object to provide a windrow or swath lifter of the type disclosed in the previously identified Ostman patent but having a pair of ground engaging supporting wheels of substantially smaller diameter than the diameter of the rotary tine carrying drum and respectively carried by a pair of separate axle members rigidly supported by a frame structure having a top cross member extending across above said drum.

More specifically, it is an object of our invention to provide a swath lifter having a plurality of lifting tines constructed of resilient elongated elements bent forwardly upwardly three quarters of the distance outwardly from the inner ends thereof whereby the desired gentle and slightly resilient lifting action is produced on the grain, said lifter mechanism being mounted on conventional automobile size wheels of substantially smaller diameter than the tine carrying drum and rigidly supported on separate axle shafts carried by a rigid supporting frame with an overhead compression member and said machine having a rotary cleaning mechanism having a plurality of spaced cleaning tines having the outer ends thereof bent rearwardly at one-fifth of the distance inwardly from the outer ends thereof and disposed to travel downwardly between the spaced tines of the lifting drum to remove the grain herefrom.

These and other objects and advantages of our invention will more fully appear from the following description made in connection with the accompanying drawings wherein like reference characters refer to the same or similar parts throughout the several views and in which:

Fig. 1 is a front perspective view of our improved machine;

Fig. 2 is a longitudinal vertical sectional view taken substantially along the line 2—2 of Fig. 1; and Fig. 3 is a fragmentary transverse vertical sectional view showing the mounting of the wheel axle and drum shaft on one side of the machine.

As illustrated in the accompanying drawings, we provide a suitable frame structure having a tongue element 8 at the front end thereof, a pair of forwardly converging tongue braces 9 and a rear frame structure having a front cross member 10 and two longitudinally disposed frame members 11 and 12 having their forward ends connected to the front cross member 10. A pair of vertically disposed posts 13 and 14 are respectively mounted on the medial portions of the longitudinally disposed members 11 and 12 as by being bolted thereto, as best shown in Fig. 3, a bracket 15 being securely fixed to said posts and adapted to receive the bolts 16 to respectively connect said posts to the longitudinal frame member. A wheel axle shaft 17 is journalled at the lower end of each of said posts and each axle shaft 17 carries a wheel 18 thereon. A reel shaft 19 is journalled in said post members 13 and 14 in suitable bearings 20 disposed adjacent the longitudinal frame members 11 and 12, as best shown in Fig. 3. The shaft 19 of course extends across between the frame members 11 and 12 above the axle shafts 17 and is driven by one of the ground-engaging wheels 18, as best shown in Fig. 1, as by a chain and sprocket driving connection 21 interconnecting one of the shafts 17 with shaft 19.

A rotary tine carrying drum structure, designated as an entirety by the numeral 22, is mounted on shaft 19 for rotation therewith and carries a plurality of spaced tines 22a in substantially radially disposed relation thereto. Each of the tines is bent at a point approximately one-quarter of the distance from the outer end thereof at an obtuse angle and in a direction so that the outer extremity is disposed a slight distance forwardly of the main tine body when in grain-engaging position and is disposed downwardly from the main tine body when traveling upwardly at the rear portion of the rotational travel thereof. The driving connection between the wheel and the rotary tine carrying drum is designed to produce a rotational speed in said drum whereby the rearward rectilinear speed of the tines in grain-engaging position will be equal to one-half of the forward speed of the machine so that a gentle lifting action similar to that previously described in the Ostman patent will be produced on the windrowed grain. With the bend formed one-quarter of the way inwardly from the outer extremity of each of the tines it has been found by experimentation that the optimum lifting action of the tines is produced as well as the optimum cooperation with the cleaning mechanism to facilitate removal of any of the grain retained thereon.

This cleaning mechanism in the form shown consists in a rotary cleaning or discharge beater formed from a rotary shaft 24, journalled between the rear portions of frame members 11 and 12 in suitable bearings 25, and a plurality of spaced substantially radially disposed cleaning tines 26, which tines are fixed to said shaft 24 for rotation therewith and are of such a length and are positioned so as to travel downwardly through the spaces between the lifting tines 22a in overlapped relation thereto. The shaft 24 and drum shaft 19 are mounted in substantially horizontally opposed relation and a chain and sprocket driving connection therebetween produces rotation of shaft 24 in the same direction as shaft 19 and at a speed somewhat faster than the rotation of shaft 19. Each of the cleaning tines 26 is bent slightly at a point approximately one-fifth of the distance from the outer end thereof to the inner end and this bend forms a flat obtuse angle with the main body of each tine and extends in a direction so that the outer portion of each tine is disposed rotationally behind the main body thereof and is disposed a slight distance upwardly from said main tine body when each tine is in operative cleaning position. The extreme end portion of each tine 26 has at least one bend extending in the opposite direction from the first mentioned bend to form a stalk engaging hook element on the extreme end portion thereof. It should be noted that the tines 22a are, in the form shown, traveling upwardly with drum 22 when intermeshed with the forwardly extending tines 26 which are traveling downwardly when in intermeshed position, whereby any grain retained on the tines 22a will be positively engaged by the cleaning tines 26 and returned to the windrow. There is substantial clearance of course between the outer ends of cleaning tines 26 and the top of the windrow as is illustrated in Fig. 2 to prevent engagement of said tines with the windrowed grain.

By using the relatively small wheels 18 which are in conventional use on automotive vehicles and on which are mounted standard size pneumatic rubber tires in the form shown, the only prior supporting means for the wheel mounting posts 13 and 14 were the respective outstanding portions of the drum shaft 19. When traveling over relatively rough ground, considerable vibration and bending moment was produced on the ends of this drum shaft 19 which caused actual bending of the shaft ends and, in some cases, breakage thereof. After long experimentation, applicants found that by extending the wheel mounting posts 13 and 14 upwardly a sufficient distance to permit a cross member 23 to be extended in fixed relation therebetween and take up the compressive stress produced thereon, a sufficiently rigid structure would be produced to securely support and mount the wheels 18 under even extremely rough operating conditions. Obviously, since the diameter of lifting drum 22 with the lifting tines 22a connected therewith is substantially greater than the diameter of the wheels 18, it is necessary to position the axis of rotation of said wheels 18 a substantial distance below the axis of rotation of said drum 22, thus making it impossible to mount said wheels on a single elongated axle shaft extending across the entire width of the machine and we have found that the cross compression member 23 rigidly interconnecting the posts 13 and 14 above the outer periphery of the tine carrying drum 22 provides the necessary rigidity for supporting the two separate wheel axle shafts 17.

The following is a description of the operation of our improved swath lifter machine. In the form shown, and described herein, the machine is drawn over the ground and the wheels 18 cause rotation of the drum 22 at a speed approximately one-half the speed at which the machine is being moved. In other words, the peripheral velocity of the swath engaging tines 22a in a rearward direction at the lower portion of each revolution of the drum 22 is one-half of the rectilinear speed at which the machine is being drawn. This produces a gentle lifting action greatly similar to the lifting action produced by the Ostman structure previously identified herein by pulling each of said tines forwardly into and under the grain in the windrow thereby lifting and loosening the grain stalks one from another and raising the same to rest on the top of the stubble in the field. The simultaneous rotation of the cleaning tines 26 removes the grain retained on the lifting tines 22a and prevents winding of said grain on drum 22 to produce continuous efficient operation of the machine. The upright posts and transversely disposed overhead cross member 23 rigidly support the wheel bearings and drum bearings even when the machine is traveling over extremely rough ground. The cooperative bent relationship of the tines 22a and 26 produces extremely efficient and gentle lifting action on the windrowed grain while positively returning all of the grain back to the windrow without knocking the grain berries therefrom.

It will be seen that our present improved swath lifting machine provides an extremely rigid wheel mounting structure while permitting wheels of substantially smaller diameter than the diameter of the lifting drum as well as providing a highly efficient self-cleaning mechanism which positively prevents winding and clogging of the grain stalks on the lifting tines.

It will, of course, be understood that various changes may be made in the form, details, ar-

What we claim is:

1. A machine for gently lifting windrowed grain comprising a supporting frame structure including a pair of laterally spaced generally upright frame members and a pair of substantially horizontal spaced longitudinal frame members respectively connected at their intermediate portions with intermediate portions of said upright members, a rotatable drum transversely journalled for rotation on an intermediate portion of said frame structure and including a plurality of substantially radially disposed lifting tines, the outer ends of said tines defining a substantially cylindrical surface disposed at its lower portion in close association to the ground surface, a pair of ground-engaging wheels of substantially smaller diameter than the diameter of the cylinder defined by said tines, a pair of laterally extending wheel axles respectively mounted at the lower portions of said upright frame members and respectively carrying said ground-engaging wheels, and a rigid cross frame member fixed to the upper ends of said upright frame members and extending transversely across above said drum.

2. A machine for gently lifting windrowed grain comprising a supporting frame structure including a main frame and a wheel-carrying frame having intermediate portions thereof interconnected, a rotary drum having the end portions thereof respectively journalled in said wheel-carrying frame at intermediate portions thereof, a pair of wheel axle shafts mounted in transversely spaced relation in the lower portion of said wheel-carrying frame, a pair of ground-engaging wheels respectively carried by said axles, said drum including a plurality of substantially radially disposed grain engaging lifting tines, the outer ends of said tines defining a substantially cylindrical surface having the lower portion thereof disposed substantially adjacent the ground surface, said ground-engaging wheels being of substantially smaller diameter than the diameter of the cylinder defined by said tines, means driving said rotary drum to rotate the same, and a rigid cross frame element forming a part of said wheel mounting frame and extending across above said drum to rigidly support said wheels and said drum.

3. A self-cleaning machine for gently lifting windrowed grain and comprising a supporting frame structure including a wheel supporting frame having a pair of generally upstanding wheel-carrying structures rigidly interconnected at their upper extremities by a cross frame member, a pair of laterally extending axle shafts respectively mounted at the lower portions of said wheel carrying upright structures, a rotatable drum journalled for rotation on said supporting frame structure for rotation on an axis disposed above the axis of rotation of said ground-engaging wheels, said drum being of substantially greater diameter than the diameter of said wheels and including a plurality of substantially radially disposed grain engaging lifting tines, a cleaning beater mounted on said supporting frame structure in substantially horizontally opposed relation to said drum and including a plurality of cleaning tines extending radially outwardly and of a length adapted to overlap the lifting tines of said drum, and means for rotating said drum and said beater in the same direction whereby the opposed portions thereof will travel in opposite directions.

4. A self-cleaning machine for gently lifting windrowed grain comprising a supporting structure, at least a pair of ground-engaging wheels journalled on said supporting structure and carrying the same, a plurality of circumferentially and transversely spaced lifting tines journalled for rotation on said supporting structure on a transverse axis, each of said lifting tines having a slight, forwardly extending bend formed in the outer portion thereof to position the outer extremity of each tine forwardly of the main depending portion thereof when in grain-engaging position, means for positively rotating said tines, a rotary cleaning beater journalled on said supporting structure for rotation on an axis disposed in spaced parallel relation to the axis of said tines and having a plurality of substantially radially extending tines each having a trailing bend formed in the outer portion thereof with a reverse bend formed in the extreme outer portion thereof, and said cleaning tines being positioned to intermesh with the lifting tines to travel downwardly as the lifting tines are traveling upwardly to remove in a downward direction grain that has been retained on the lifting tines and prevent said grain from winding on the lifting tines and on the cleaning tines.

References Cited in the file of this patent

UNITED STATES PATENTS

| Number | Name | Date |
|---|---|---|
| 80,806 | Caryl | Aug. 11, 1868 |
| 87,982 | Spangler | Mar. 16, 1869 |
| 2,328,121 | Bartek | Aug. 31, 1943 |
| 2,330,910 | Ostman | Oct. 5, 1943 |
| 2,482,883 | Thomas | Sept. 27, 1949 |
| 2,529,422 | Sampson | Nov. 7, 1950 |
| 2,559,862 | Ferguson | July 10, 1951 |